United States Patent [19]
Zavaleta

[11] Patent Number: 5,392,205
[45] Date of Patent: Feb. 21, 1995

[54] REGULATED CHARGE PUMP AND METHOD THEREFOR

[75] Inventor: Mauricio A. Zavaleta, Austin, Tex.

[73] Assignee: Motorola, Inc., Schaumburg, Ill.

[21] Appl. No.: 789,248

[22] Filed: Nov. 7, 1991

[51] Int. Cl.$^6$ .............................................. H02M 3/18
[52] U.S. Cl. ..................................... 363/59; 363/60; 323/311; 323/285
[58] Field of Search .......................... 363/59, 60, 61; 323/311, 275, 285; 307/296.6, 296.8

[56] References Cited

U.S. PATENT DOCUMENTS

| | | | |
|---|---|---|---|
| 3,909,695 | 9/1975 | Peck | 363/25 |
| 4,278,929 | 7/1981 | Lee et al. | 323/311 |
| 4,291,366 | 9/1981 | Nelson | 363/17 |
| 4,430,641 | 2/1984 | Baur et al. | 340/347 DA |
| 4,438,346 | 3/1984 | Chuang et al. | 307/297 |
| 4,471,290 | 9/1984 | Yamaguchi | 323/274 |
| 4,553,047 | 11/1985 | Dillinger et al. | 307/297 |
| 4,752,699 | 6/1988 | Cranford, Jr. et al. | 307/297 |
| 4,803,612 | 2/1989 | Skovmand | 323/284 |
| 4,807,104 | 2/1989 | Floyd et al. | 363/59 |
| 4,965,711 | 10/1990 | Kamp et al. | 363/60 |

OTHER PUBLICATIONS

"MPT 1375, Common Air Interface Specification", Department of Trade and Industry, London, 1989.
"MC145532 ADPCM Transcoder Product Review", in Motorola Telecommunications Device Data, DL 136, Rev. 2, Motorola, Inc. 1989.
"MC145554/MC145557/MC145564/MC145567 PCM Codec-Filter", in Motorola Telecommunications Device Data, DL 136, Rev. 2, Motorola, Inc., 1989.

*Primary Examiner*—Steven L. Stephan
*Assistant Examiner*—Adolf Berhane
*Attorney, Agent, or Firm*—Paul J. Polansky

[57] ABSTRACT

A regulated charge pump (43) includes a charge pump core (114) having a charging capacitor (80). An output voltage on a first terminal (72) of the charging capacitor (80) is transferred to a holding capacitor (81). A second terminal (73) of the charging capacitor (80) is alternatively connected to positive and negative power supply voltage terminals in response to non-overlapping clock signals. The first terminal (72) of the charging capacitor (80) is connected through first (150) and second (151) transistors to the positive power supply voltage terminal. A proportional portion (112) provides a coarse regulation by biasing the first transistor (150) proportional to a comparison between a predetermined fraction of an output voltage and a reference voltage. An integrating portion (113) provides a precise regulation by biasing the second transistor (151) proportional to an integrated difference between the output voltage and a reference voltage.

19 Claims, 4 Drawing Sheets

REGULATED CHARGE PUMP AND METHOD THEREFOR

CROSS REFERENCE TO RELATED, COPENDING APPLICATION

Related, copending application is application Ser. No. 07/788,977, filed concurrently herewith, by Luis A. Bonet et al., and assigned to the assignee hereof, entitled "Mixed Signal Processing System and Method of Powering Same".

1. Field of the Invention

This invention relates generally voltage generator circuits, and more particularly, to regulated charge pump circuits.

2. Background of the Invention

In some integrated circuits, it is necessary to increase an available power supply voltage to provide to internal circuitry. For example, electrically erasable programmable read only memories (EEPROMs) require a voltage substantially above the conventional +5.0-volt power supply to program a memory bit. An internal charge pump circuit increases the power supply voltage to the desired programming voltage. A conventional technique to increase the internal voltage is to use a voltage multiplier circuit. The voltage multiplier circuit is based on a charging capacitor and two phases of a clock. During one clock phase, the power supply voltage is applied to a first terminal of the charging capacitor while a second terminal is grounded. Then, during the second phase, the power supply voltage source is isolated from the first terminal of the charging capacitor. The second terminal is disconnected from ground, and the power supply voltage is applied to the second terminal. Thus, the first terminal of the charging capacitor is boosted to a voltage of twice the power supply voltage referenced to ground. This voltage, at the first terminal of the charging capacitor, is then used to charge a holding capacitor. At the end of the second clock phase, the first terminal of the charging capacitor is isolated from the holding capacitor and is again coupled to the power supply voltage. The voltage of the holding capacitor provides the charge-pumped voltage. This example demonstrated a voltage multiplier with an integer multiple of two; in the absence of loading, the charge-pumped voltage is equal to twice the power supply voltage. Other charge pump circuits have two such charge pumps connected in series to provide a voltage multiplier with an integer multiple of four.

A voltage-multiplying charge pump circuit may be useful also in battery-based systems. Since the battery voltage may be low, a charge pump circuit may be used to increase the voltage to internal circuitry. However, this creates problems. A battery voltage may vary widely between the time it is first used (either a new battery or a newly-recharged battery) and the time it goes dead. For example, three type AA batteries may be used to form a power supply with a nominal voltage of 3.75 volts, which is usually acceptable for integrated circuits which use the conventional +5.0 volt power supply. Before going dead, the battery voltage may fall to approximately 2.7 volts. Thus, a voltage-doubling charge pump circuit could be used to increase the 2.7-volt power supply voltage to 5.4 volts. However, when the batteries are new, each battery voltage may be as much as 1.8 volts, and the charge-pumped power supply voltage would be unacceptably high. For example, a voltage doubling charge pump would provide voltages between 10.8 and 5.4 volts between recharges. A 10.8-volt power supply is harmful because reliability could be reduced in circuits designed to work at 5.0 volts. If complementary metal-oxidesemiconductor (CMOS) technology is used, gate rupture and latchup may occur. Thus, it is necessary to limit the power supply voltage to an acceptable level.

Several techniques are available to limit the voltage. A clamping device, such as a Zener diode, could be used to reduce the output voltage. The clamping device sinks current during the period of excess voltage to drop the voltage to the required level. Also, shunt regulation methods may be used to reduce the output voltage. However, in either case the charge pump wastes current through the Zener diode or regulation device. As more current is wasted, battery life shortens. Thus, techniques other than the use of passive devices to limit the voltage are needed.

SUMMARY OF THE INVENTION

Accordingly, there is provided, in one form, a regulated charge pump comprising a charge pump core, proportional means, and integrating means. The charge pump core boosts a first voltage existing at a first terminal of a charging capacitor during a first predetermined time period, by an amount equal to a first power supply voltage referenced to a second power supply voltage during a second predetermined time period and provides a regulated charge-pumped voltage in response. The charge pump core comprises first and second transistors. The first transistor has a first current electrode for receiving the first power supply voltage, a control electrode, and a second current electrode coupled to the first terminal of the charging capacitor. The second transistor has a first current electrode for receiving the first power supply voltage, a control electrode, and a second current electrode coupled to the first terminal of the charging capacitor. The proportional means is coupled to the control electrode of the first transistor changes the first voltage proportionately in response to a difference between a reference voltage and a proportional voltage, by altering a conductivity of the first transistor the proportional voltage being a predetermined fraction of the regulated charge-pumped voltage, the predetermined fraction making the proportional voltage equal to the reference voltage when the regulated charge-pumped voltage is equal to a desired value. The integrating means is coupled to the control electrode of the second transistor, and further changes the first voltage proportionately in response to an integration of a difference between the proportional voltage and the reference voltage by altering a conductivity of the second transistor.

In another form, there is provided a method of providing a regulated charge-pumped voltage, comprising the steps of providing a charging capacitor; alternately, coupling a second terminal of the charging capacitor to a first power supply voltage terminal, or coupling the second terminal of the charging capacitor to a second power supply voltage terminal, respectively in response to first and second non-overlapping clock signals; providing the regulated charge-pumped voltage in response to a first voltage at a first terminal of the charging capacitor; forming a second voltage proportional to the regulated charge-pumped voltage; comparing the second voltage to a reference voltage; biasing a first transistor, coupled between the first power supply voltage terminal and a first terminal of the charging capacitor, to be conductive proportionally to a comparison of the second voltage to the reference voltage; integrating a difference between the second voltage and the reference voltage; and biasing a second transistor, coupled between the first power supply voltage terminal and the first terminal of the charging capacitor, to be conductive proportionally to a integrated difference between the second voltage and the reference voltage.

These and other features and advantages will be more clearly understood from the following detailed description taken in conjunction with the accompanying drawings.

DETAILED DESCRIPTION OF THE INVENTION

Figure 1:
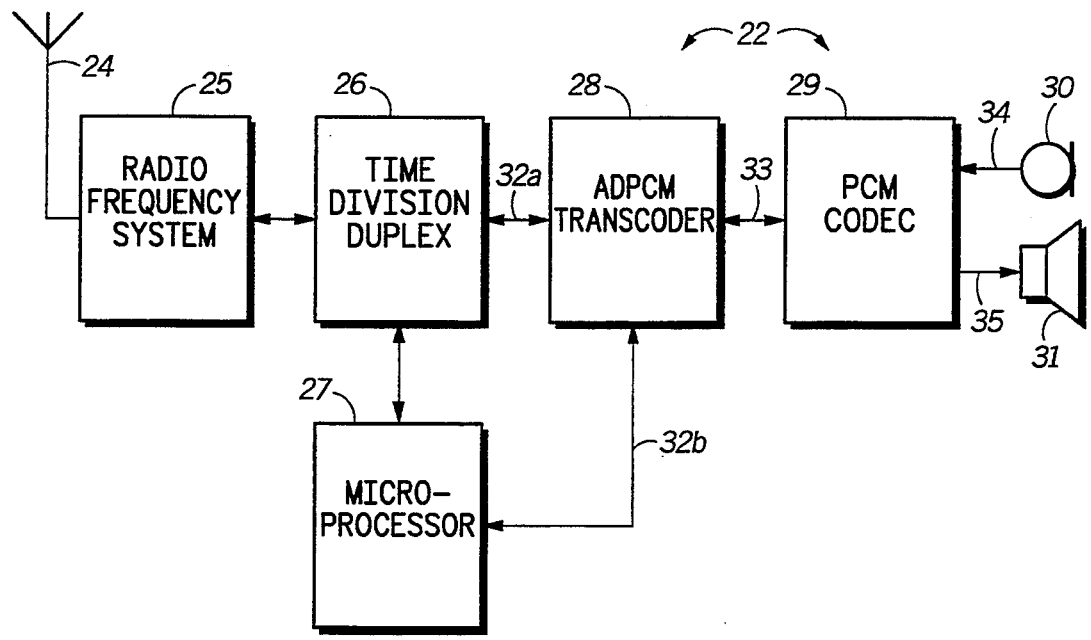
FIG. 1 illustrates in block form a digital cordless telephone handset utilizing a mixed signal processing system in accordance with the present invention.

FIG. 1 illustrates in block form a digital cordless telephone handset 20 utilizing a mixed signal processing system 22 in accordance with the present invention. Handset 20 implements a standard protocol, such as the U.K. Cordless Telephone, Second Generation (CT-2) or the Digital European Cordless Telephone (DECT) standard. For example, according to the CT-2 protocol, telephone signals are received and transmitted digitally in packets in a half-duplex or ping-pong scheme between handset 20 and a base station (not shown in FIG. 1). An antenna 24 is used for transmitting and receiving radio-frequency (RF) representations of telephonic signals. An RF system 25 is connected to antenna 24 for receiving and demodulating, and transmitting and modulating, digital streams of telephonic data. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signalling bits.

A packet from the base station is received as a modulated RF signal on antenna 24. Radio frequency system 25 receives the RF signal and demodulates it. The modulation scheme is a two-level FSK shaped by an approximately Gaussian filter, as described in the CT-2 Common Air Interface Specification. The packet is then presented to a time division duplex block 26. Time division duplex block 26 splits the packet into its two constituent components, making the signalling bits available to microprocessor 27. Time division duplex block 26 makes the compressed digital signal available to mixed signal processing system 22 through input and output signals 32a. Subsequently, microprocessor 27 reads the signalling bits and performs associated signalling functions, such as call setup and disconnect.

Mixed signal processing system 22 includes an adaptive differential pulse code modulation (ADPCM) transcoder 28, and a pulse code modulation (PCM) coder-decoder (codec) 29. ADPCM transcoder 28 decompresses the compressed digital signal received from time division duplex block 26 by a conventional algorithm, such as the CCITT Recommendation G.721 or the American National Standard T1.301-1988. When decompressed, the digital signal exists as digital PCM data compressed by a conventional algorithm such as A-law or $\mu$-law. ADPCM transcoder is connected via input and output signals 32b to microprocessor 27. Microprocessor 27 initializes and controls the operation of ADPCM transcoder 28 through input and output signals 32b. PCM codec 29 receives the PCM data via input and output signals 33, performs A-law or $\mu$-law decompression to form an analog telephone signal, and provides the analog telephone signal to a speaker 31 and a ringer (not shown in FIG. 1) via output signals 35. Additional interface circuitry between ADPCM transcoder 28 and PCM codec 29 is not shown in FIG. 1.

A microphone 30 provides an analog telephone signal via input signal lines 34 to PCM codec 29. PCM codec 29 converts the analog telephone signal to a digital telephone signal and compresses it according to the A-law or $\mu$-law algorithm, and provides the digital telephone signal to ADPCM transcoder 28 via input and output signals 33. ADPCM transcoder 28 in turn compresses the digital telephone signal according.-to the conventional algorithm (such as the CCITT G.721 or ANSI T1.301-1988 standard) and provides the compressed digital signal to time division duplex block 26. Time division duplex block 26 then combines signalling bits from microprocessor 27 with the compressed digital data from APDCM transcoder 28 to form a CT-2 packet. Time division duplex block 26 provides the CT-2 packet to radio frequency system 25, which modulates it and provides it as an RF signal to antenna 24, where it is radiated and eventually received by the base station. PCM codec 29 performs the function of a conventional integrated circuit, such as the Motorola MC145554 law PCM Codec-Filter or the Motorola MC145557 A-law PCM Codec-Filter. ADPCM transcoder 28 also performs the function of a conventional integrated circuit, such as the Motorola MC145532 ADPCM Transcoder.

PCM codec filter 29 is primarily analog, while ADPCM transcoder 28 is primarily digital; however, mixed signal processing system 22 is required to operate from a single battery power supply formed typically by three type AA batteries (not shown in FIG. 1). Mixed signal processing system 22 must operate on battery voltages varying from 2.7 volts to 5.25 volts and still meet the CT-2 specification. At the same time, power consumption must be kept to a minimum in order to maximize battery life. ADPCM transcoder 28 must perform its operation within the time required to process packets to operate on continuous, real-time speech signals. Also, reliable operation is required. Thus, a new approach which solves these problems is needed. Mixed signal processing system 22 satisfies these requirements as is now illustrated with reference to FIG. 2.

Figure 2:
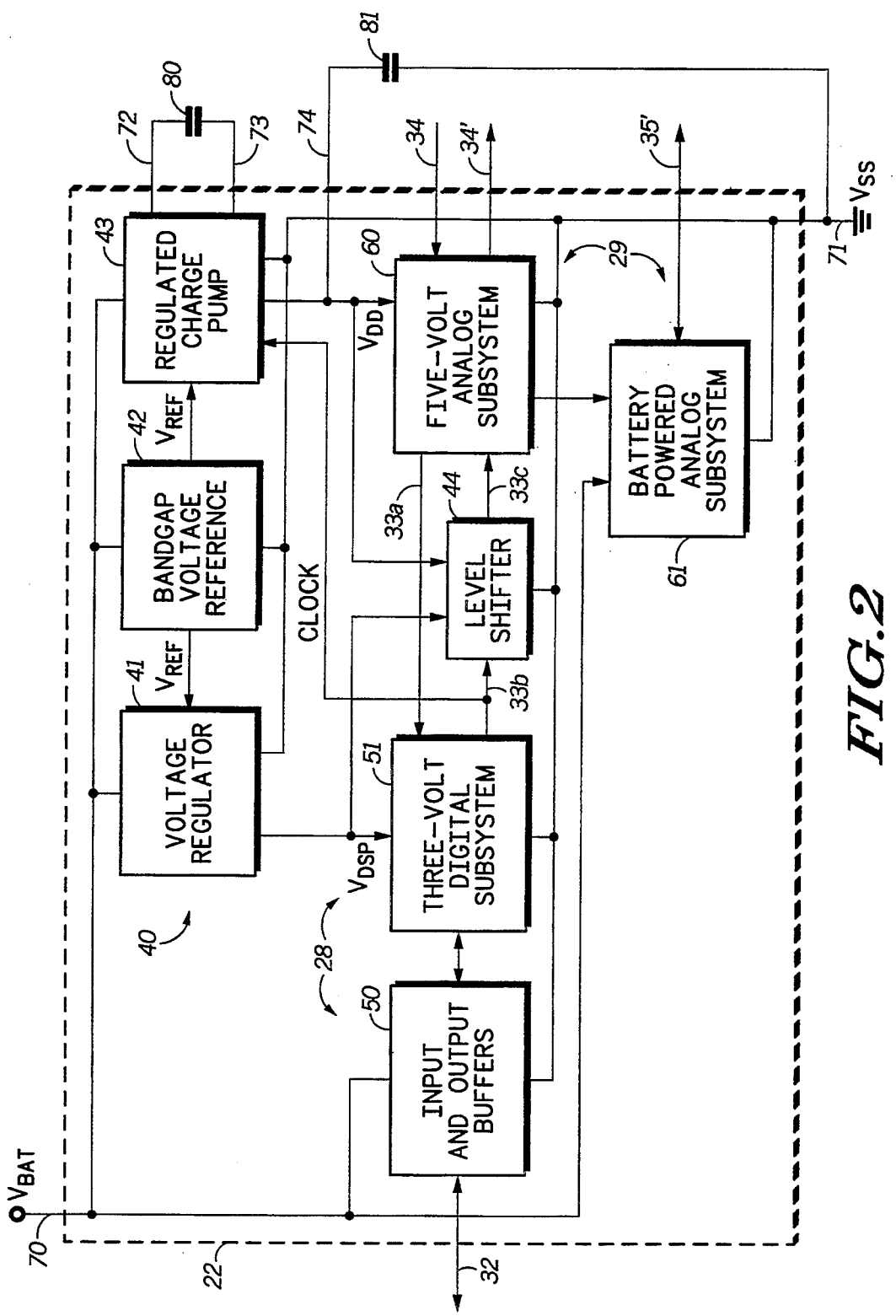
FIG. 2 illustrates in partial block form and partial schematic form the mixed signal processing system of FIG. 1.

FIG. 2 illustrates in partial block form and partial schematic form mixed signal processing system 22 of FIG. 1. Mixed signal processing system 22 includes ADPCM transcoder 28 and PCM codec filter 29 as previously illustrated in FIG. 1. In addition, mixed signal processing system 22 includes a power supply subsystem 40 having a voltage regulator 41, a bandgap voltage reference 42, and a regulated charge pump 43, a level shifter 44, and several power supply terminals and signal lines. The terminals include a terminal 70 for receiving a voltage labelled "$V_{BAT}$", a terminal 71 for receiving a voltage labelled "$V_{SS}$", a first capacitor terminal 72, a second capacitor terminal 73, and a third capacitor terminal 74. The signal lines include input and output signal lines 32, input signal lines 34, output signal lines 34', and input and output signal lines 35'. Signal lines corresponding to signal lines in FIG. 1 are given the same reference number. However, input and output signal lines 32 of FIG. 2 include input and output signal lines 32a and 32b as previously illustrated in FIG. 1, and input and output signal lines 35' include output signal line 35 of FIG. 1 and other input and output signal lines not shown in FIG. 1. ADPCM transcoder 28 includes input and output buffers 50, and a three-volt digital subsystem 51. PCM codec 29 includes a five-volt analog subsystem 60, and a battery-powered analog subsystem 61. A first capacitor 80 is connected between terminals 72 and 73, and a second capacitor 81 is connected between terminals 74 and 71.

$V_{BAT}$ is a battery voltage provided by, for example, three type AA nicad batteries (not shown in FIG. 2) having a nominal voltage of 3.75 volts but varying between 2.7 and 5.4 volts between recharges. $V_{SS}$ is a common, or ground power supply voltage having a nominal value of zero volts. Thus, mixed signal processing system 22 is only connected to a single, battery-derived power supply. In power supply subsystem 40, bandgap voltage reference 42 is connected to $V_{BAT}$ and $V_{SS}$ and provides a stable, precise voltage labelled "$V_{REF}$" in response. Bandgap voltage reference 42 is a bandgap voltage reference circuit which is able to operate at power supply voltages down to approximately 2.7 volts, such as is disclosed in patent application docket number SC-01229A, application number unknown, filed Oct. 28, 1991, by Greaves et al. and assigned to the assignee hereof, entitled "Bandgap Voltage Reference Circuit", which is herein incorporated by reference.

Voltage regulator 41 is connected between $V_{BAT}$ and $V_{SS}$, and receives voltage $V_{REF}$ to provide an internal reference. Voltage regulator 41 is a conventional CMOS voltage regulator which provides a regulated output voltage, labelled "$V_{DSP}$". $V_{DSP}$ has a nominal value of 3.0 volts which remains substantially constant with variations in $V_{BAT}$ until $V_{BAT}$ approaches 3.0 volts. As $V_{BAT}$ falls below 3.0 volts (when the voltage of the nicad batteries falls due to discharge), $V_{DSP}$ likewise compresses.

Power supply subsystem 40 also includes regulated charge pump 43, which is connected between $V_{BAT}$ and $V_{SS}$. Regulated charge pump 43 is connected to the first terminal of first capacitor 80 via terminal 72, to the second terminal of first capacitor 80 via terminal 73, and to the first terminal of second capacitor 81 via terminal 74, receives voltage $V_{REF}$ and a clock signal labelled "CLOCK", and provides an output voltage labelled $V_{DD}$. Regulated charge pump 43 combines two conventional functions. First, regulated charge pump 43 increases the voltage of $V_{BAT}$ through clocked capacitive charge pumping. In a preferred embodiment, mixed signal processing system 22 is included in a single monolithic integrated circuit. Capacitors 80 and 81 are too large to be provided monolithically and thus are external to the integrated circuit. Second, regulated charge pump 43 regulates the charge-pumped voltage to provide a voltage labelled "$V_{DD}$". $V_{DD}$ has a nominal voltage of approximately 5.0 volts, but remains substantially constant as $V_{BAT}$ changes (due to the regulation).

ADPCM transcoder 28 is a conventional ADPCM transcoder modified to separate internal circuitry in accordance with differing power supply requirements. In ADPCM transcoder 28, input and output buffers 50 are separated from three-volt digital subsystem 51 and are connected between $V_{BAT}$ and $V_{SS}$, and provide and receive signals via input and output signal lines 32. Three-volt digital subsystem 51 performs all the functions of a conventional ADPCM transcoder except for the functions provided by input and output buffers 50. Subsystem 51 is connected between $V_{DSP}$ and $V_{SS}$, connects to input and output buffers 50, receives input signals from five-volt analog subsystem 60, and provides output signals to level shifter 44 via signal lines 33b, one of which is signal CLOCK, which is also provided to regulated charge pump 43. Level shifter 44 receives power supply voltages $V_{DSP}$ and $V_{DD}$ and is coupled to $V_{SS}$, and level shifts the signals conducted on signal lines 33b and provides corresponding signals 33c to subsystem 60. PCM codec 29 is a conventional PCM codec modified to separate internal circuitry in accordance with differing power supply requirements. In PCM codec 29, five-volt analog subsystem 60 performs all the functions of a conventional PCM codec except the special functions performed by subsystem 61 as described below. Subsystem 60 is connected between $V_{DD}$ and $V_{SS}$, receives a microphone signal via input signal lines 34, and connects to subsystem 51 via signal lines 33a. Battery-powered analog subsystem 61 is connected between $V_{BAT}$ and $V_{SS}$ and is connected to input and output signal lines 35'.

Mixed signal processing system 22 has several advantages over known mixed signal processing systems. First, mixed signal processing system 22 reduces power consumption. Voltage regulator 41 provides a power supply voltage, $V_{DSP}$, to subsystem 51 which is substantially constant with respect to changes in $V_{BAT}$. By setting the power supply voltage near the minimum voltage at which the circuitry will operate, power consumption of digital subsystem 51 is minimized. At the same time, digital subsystem 51 performs the ADPCM transcoder functions (except the input and output functions) quickly enough at ($V_{DSP}$=3.0 volts) to meet the specifications, including speech compression and decompression in real time. In a preferred embodiment, subsystem 51 uses CMOS digital logic. CMOS logic circuitry may be designed to operate at high speed and low power supply voltage, such as at 3.0 volts. However, such circuitry consumes large amounts of power when the power supply voltage is increased to around 4.0 or 5.0 volts, and in addition, integrated circuit area increases due to a need for additional area for power supply busses. At reduced power consumption levels, junction temperatures are reduced; thus, integrated circuit packaging specifications may be relaxed and reliability is enhanced. An added benefit is that digital subsystem 51 is designed to operate within a narrow range of power supply voltages, simplifying circuit design.

Second, mixed signal processing system 22 performs analog functions reliably despite changes in $V_{BAT}$. Regulated charge pump 43 provides a power supply voltage, $V_{DD}$, having a voltage high enough for desired analog operation. At $V_{DD}$ of 5.0 volts, analog circuitry in analog subsystem 60 has sufficient headroom to operate linearly. In addition, harmfully high voltages provided by conventional integer charge pumping are avoided. As an example, if analog circuitry were powered directly from $V_{BAT}$, performance would diminish if $V_{BAT}$ were near the low end of its range (about 2.7 volts). the other hand, if a standard 2X integer charge pump were used to power the analog circuitry, then the voltage range would be from 5.4 to about 10.8 volts. At the high end of the range, reliability is reduced.

Third, mixed signal processing system 22 reliably interfaces to external circuitry. Mixed signal processing system 22 separates input and output buffers 50 from digital subsystem 51. While digital subsystem 51 is connected to $V_{DSP}$, input and output buffers 50 are connected between $V_{BAT}$ and $V_{SS}$. Thus, logic high output signal levels of input and output buffers 50 correspond to the output signal levels of other devices, such as microprocessor 27. As illustrated in FIG. 1, ADPCM codec 28 is connected both to time division duplex block 26 and to microprocessor 27. Internally, level shifter 44 similarly increases the logic levels of digital signals provided by digital subsystem 51 to analog subsystem 60.

Fourth, mixed signal processing system 22 reduces power consumption by powering analog subsystem 60 from $V_{DD}$ and battery-powered output subsystem 61 from $V_{BAT}$. Circuitry in analog subsystem 61 includes drivers which require a high current drive. For example, subsystem 61 includes drivers to provide analog outputs to speaker 31 of FIG. 1. By separating the circuitry, efficiency losses introduced by regulated charge pump 43 do not include losses from the high current drivers.

Figure 3:
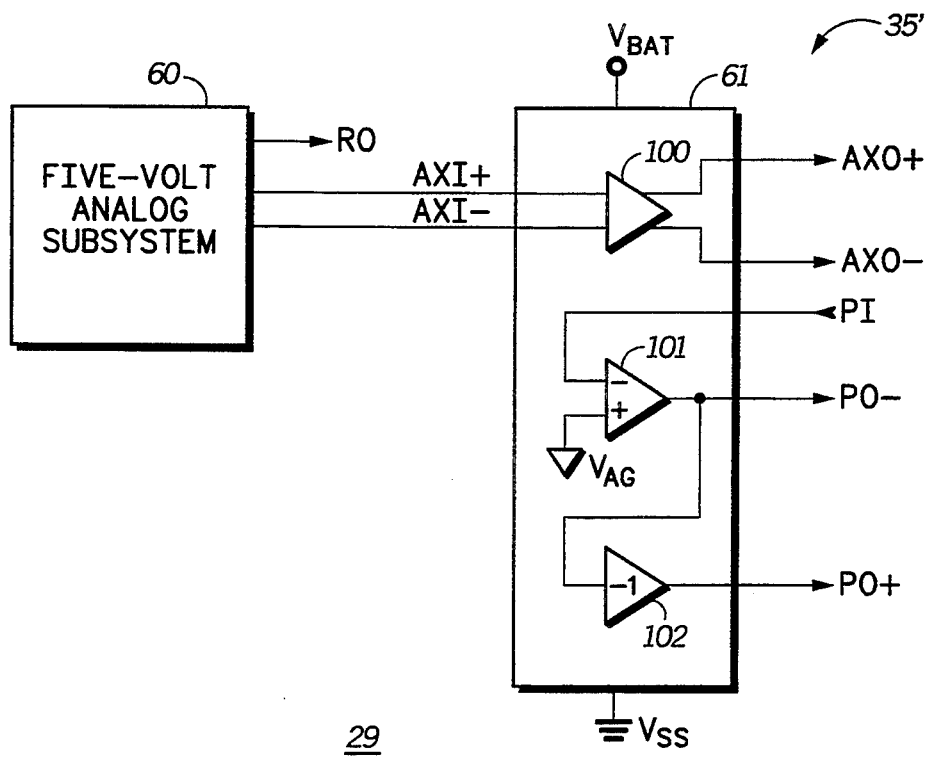
FIG. 3 illustrates in partial block form and partial schematic form the PCM codec of FIG. 2.

FIG. 3 illustrates in partial block form and partial schematic form PCM codec 29. Illustrated in FIG. 3 is analog subsystem 60 and battery-powered analog subsystem 61, which includes amplifiers 100, 101, and 102. Analog subsystem 60 provides receive analog output signals labelled "RO", "AXI+", and "AXI−". AXI+ and AXI− form a differential representation of the analog output signal. In subsystem 61, amplifier 100 is a differential amplifier which receives signals AXI+ and AXI− on input terminals and provides a signal labelled "AXO+" on a positive output terminal thereof, and a signal labelled "AXO−" on a negative output terminal thereof. Amplifier 101 is an operational amplifier which receives an input signal labelled "PI" on a negative input terminal thereof, a signal voltage labelled "$V_{AG}$" on a positive input terminal thereof, and provides a signal labelled "PO−". $V_{AG}$ is an analog ground reference voltage which has a value of approximately $V_{BAT}/2$. Amplifier 102 is an inverting amplifier which receives signal PO− on an input terminal thereof, and provides a signal labelled "PO+" on an output terminal thereof. Signals AXO+ and AXO− may be used to drive an output device such as a ringer or the like (not shown in FIG. 1). Input signal PI typically receives signal RO and is used with external resistors to set the gain of push-pull signals PO+ and PO− provided by amplifiers 101 and 102. Amplifiers 101 and 102 are large enough to drive a telephone handset earpiece or small speaker. Powering subsystem 61 from $V_{BAT}$, instead of $V_{DD}$, reduces power consumption by preventing a large power loss due to the efficiency of regulated charge pump 43 being less than 100%.

Figure 4:
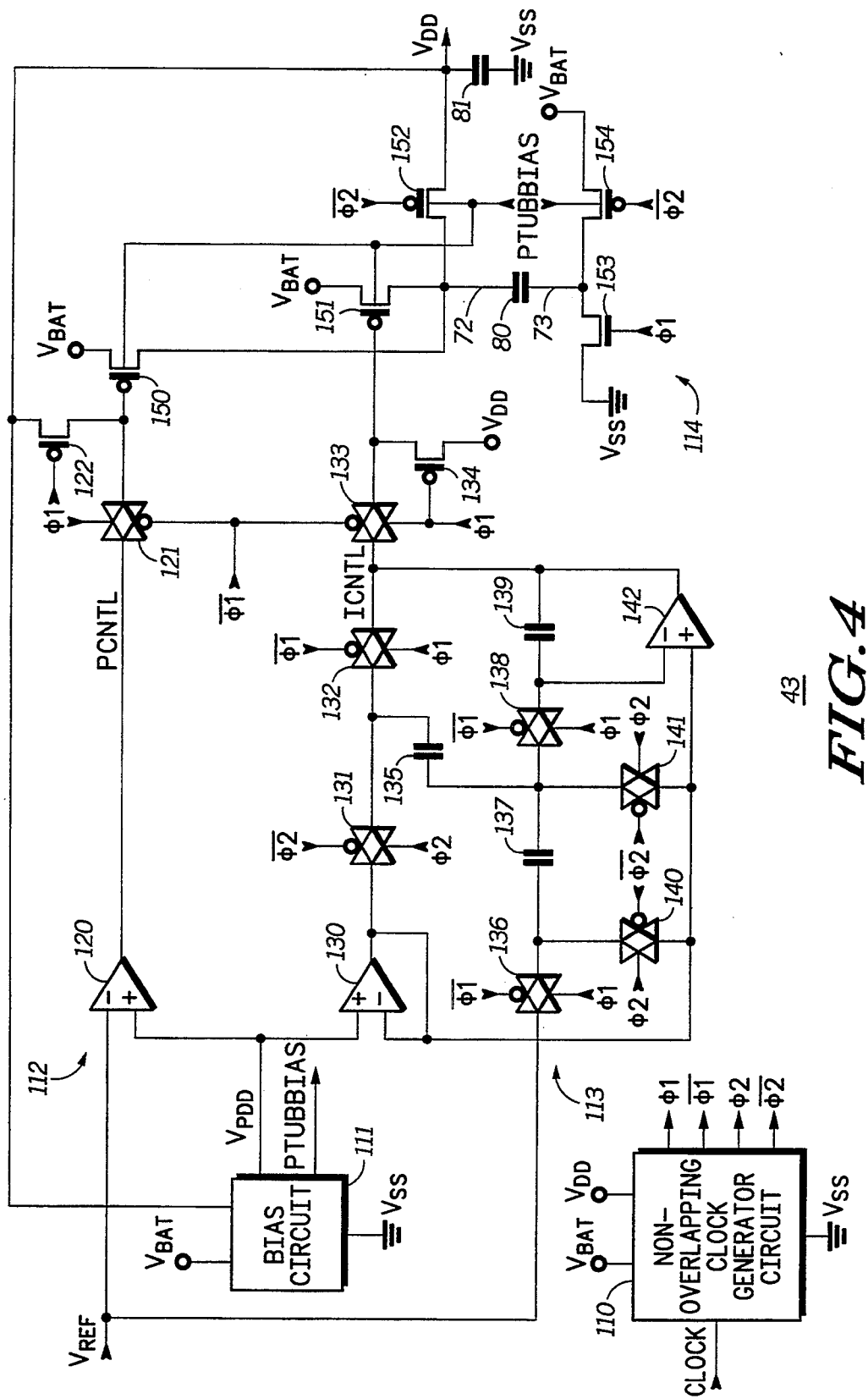
FIG. 4 illustrates in partial schematic form and partial block form the regulated charge pump of FIG. 2 in accordance with the present invention.

FIG. 4 illustrates in partial schematic form and partial block form regulated charge pump 43 of FIG. 2 in accordance with the present invention. Regulated charge pump 43 includes generally a non-overlapping clock generator circuit 110, a bias circuit 111, a proportional portion 112, an integrating portion 113, and a charge pump core 114. Proportional portion 112 includes an amplifier 120, a transmission gate 121, and a P-channel transistor 122. Integrating portion 113 includes an amplifier 130, transmission gates 131, 132, and 133, a P-channel transistor 134, a capacitor 135, a transmission gate 136, a capacitor 137, a transmission gate 138, a capacitor 139, transmission gates 140 and 141, and an amplifier 142. Charge pump core 114 includes capacitor 80, P-channel transistors 150, 151, and 152, an N-channel transistor 153, a P-channel transistor 154, and capacitor 81.

Non-overlapping clock circuit 110 receives signal CLOCK, is coupled to power supply voltages $V_{BAT}$, $V_{DD}$, and $V_{SS}$, an provides non-overlapping clock signals labelled "Φ1", "$\overline{Φ1}$", "Φ2", and "$\overline{Φ2}$", which are level-shifted to $V_{DD}$. Bias circuit 111 is coupled between power supply terminals $V_{BAT}$ and $V_{SS}$, receives power supply voltage $V_{DD}$, and provides an output signal labelled "$V_{PDD}$" and an output signal labelled "PTUBBIAS".

In proportional portion 112, amplifier 120 is an operational transconductance amplifier (OTA) having a negative input terminal for receiving signal $V_{REF}$, a positive input terminal for receiving signal $V_{PDD}$, and an output terminal for providing a signal labelled "PCNTL". Transmission gate 121 has a first current terminal for receiving signal PCNTL, a second current terminal, a positive control terminal for receiving signal Φ1, and a negative control terminal for receiving signal $\overline{Φ1}$. Transistor 122 has a source for receiving power supply voltage $V_{DD}$, a gate for receiving signal Φ1, and a drain connected to the second current terminal of transmission gate 121.

In integrating portion 113, amplifier 130 has a positive input terminal for receiving signal $V_{PDD}$, a negative input terminal, and an output terminal connected to the negative input terminal of amplifier 130. Transmission gate 131 has a first current terminal connected to the output terminal of amplifier 130, a second current terminal, a positive control terminal for receiving signal Φ2, and a negative control terminal for receiving signal $\overline{Φ2}$. Transmission gate 132 has a first current terminal connected to the second current terminal of transmission gate 131, a second current terminal for providing a signal labelled "ICNTL", a positive control terminal for receiving signal Φ1, and a negative control terminal for receiving signal $\overline{Φ1}$. Transmission gate 133 has a first current terminal for receiving signal ICNTL, a second current terminal, a positive control terminal for receiving signal Φ1, and a negative control terminal for receiving signal $\overline{Φ1}$. Transistor 134 has a source for receiving power supply voltage $V_{DD}$, a gate for receiving signal Φ1, and a drain connected to the second current terminal of transmission gate 133. Capacitor 135 has a first terminal connected to the second current terminal of transmission gate 131, and a second terminal. Transmission gate 136 has a first current terminal for receiving signal $V_{REF}$, a second current terminal, a positive control terminal for receiving signal Φ1, and a negative control terminal for receiving signal $\overline{Φ1}$. Capacitor 137 has a first terminal connected to the second current terminal of transmission gate 136, and a second terminal connected to the second terminal of capacitor 135. Transmission gate 138 has a first current terminal connected to the second terminals of capacitors 135 and 137, a second current terminal, a positive control terminal for receiving signal $\Phi1$, and a negative control terminal for receiving signal $\overline{\Phi1}$. Capacitor 139 has a first terminal connected to the second current terminal of transmission gate 138, and a second terminal connected to the second current terminal of transmission gate 132. Transmission gate 140 has a first current terminal connected to the output terminal of amplifier 130, a second current terminal connected to the second current terminal of transmission gate 136, a positive control terminal for receiving signal $\Phi2$, and a negative control terminal for receiving signal $\overline{\Phi2}$. Transmission gate 141 has a first current terminal connected to the output terminal of amplifier 130, a second current terminal connected to the second terminals of capacitors 135 and 137, a positive control terminal for receiving signal $\Phi2$, and a negative control terminal for receiving signal $\overline{\Phi2}$. Amplifier 142 has a negative input terminal connected to the second current terminal of transmission gate 138, a positive input terminal connected to the output terminal of amplifier 130, and an output terminal connected to the second current terminal of transmission gate 132 and to the second terminal of capacitor 139.

In charge pump core 114, transistor 150 has a source connected to $V_{BAT}$, a gate connected to the second current terminal of transmission gate 121, a drain, and a bulk or well receiving signal PTBUBIAS. Transistor 151 has a source connected to $V_{BAT}$, a gate connected to the second current terminal of transmission gate 133, a drain connected to the drain of transistor 150 at terminal 72, and a bulk or well receiving signal PTUBBIAS. Transistor 152 has a first current electrode connected to the drains of transistors 150 and 151, a gate for receiving signal $\overline{\Phi2}$, a second current electrode for providing power supply voltage $V_{DD}$, and a bulk or well receiving signal PTUBBIAS. Note that which current electrode is designated as source or drain depends on the voltages applied. Capacitor 80 has a first terminal connected to terminal 72, and a second terminal connected to terminal 73, as previously illustrated. Transistor 153 has a drain connected to the second terminal of capacitor 80 at node 73, a gate for receiving signal $\Phi1$, and a source connected to $V_{SS}$. Transistor 154 has a source connected to power supply voltage $V_{BAT}$, a gate for receiving signal $\overline{\Phi2}$, a drain connected to the drain of transistor 153, and a bulk or well connected to PTUBBIAS. Capacitor 81 has a first terminal connected to the second current electrode of transistor 152 via terminal 74, and a second terminal connected to $V_{SS}$, as previously illustrated.

Circuit 110 is a conventional non-overlapping clock generator circuit which receives signal CLOCK, and provides four clock signals labelled $\Phi1$, $\overline{\Phi1}$, $\Phi2$, and $\overline{\Phi2}$, which are level shifted to $V_{DD}$. Because of the non-overlap, signal $\Phi1$ is not the same as signal $\overline{\Phi2}$, and signal $\Phi2$ is not the same as signal $\overline{\Phi1}$. As previously illustrated with respect to FIG. 2, capacitors 80 and 81 are coupled to regulated charge pump circuit 43 via terminals 72 and 73, and 74 and 71, respectively. Although capacitors 80 and 81 may be viewed as integral parts of regulated charge pump 43, they are preferably external to an integrated circuit which includes regulated charge pump 43 because of their required size. For example, in the illustrated embodiment, capacitors 80 and 81 have values of approximately 0.1 and 1.0 microfarads, respectively, and thus it is impractical to build such capacitors on an integrated circuit.

Charge pump core 114 uses charging capacitor 80 to provide voltage $V_{DD}$ above voltage $V_{BAT}$. However, proportional portion 112 and integrating portion 113 alter the operation of charge pump core 114 to integrally regulate $V_{DD}$. During $\Phi1$ ($\Phi1$ is active), transistor 153 is conductive and couples the second terminal of capacitor 80 to $V_{SS}$. In a conventional charge pump design, a single transistor would also couple the first terminal of capacitor 80 to $V_{BAT}$ during $\Phi1$. $\overline{\Phi2}$ makes transistor 152 nonconductive, isolating the first terminal of capacitor 81 from $V_{DD}$. Thus, during $\Phi1$, $V_{DD}$ is maintained by holding capacitor 81. Transistor 154 is also nonconductive. However, during $\Phi2$ ($\Phi2$ active), transistor 153 is inactive, and transistor 154 is conductive and connects the second terminal of capacitor 80 to $V_{BAT}$. This action boosts the voltage at the first terminal of capacitor 80 to approximately twice $V_{BAT}$. Transistor 152 is also conductive, and the charge stored in capacitor 80 is dumped into holding capacitor 81. At the end of $\Phi2$, transistor 152 becomes nonconductive and holding capacitor 81 maintains the level of $V_{DD}$. By repeating this operation, capacitor 81 eventually charges up to approximately twice $V_{BAT}$.

However, in regulated charge pump circuit 43, the conventional transistor from the first terminal of capacitor 80 to $V_{BAT}$ is replaced by transistors 150 and 151. Transistors 150 and 151 are made conductive in response to signals PCNTL and ICNTL, which are provided by proportional portion 112 and integrating portion 113. Amplifiers 120 and 142 have outputs reference to $V_{DD}$, whereas amplifier 130 has an output referenced to $V_{BAT}$. Proportional portion 112 makes transistor 150 proportionately conductive in response to a comparison of $V_{PDD}$ and $V_{REF}$. Portion 112 has a fast response to bring $V_{DD}$ to approximately a desired voltage. Integrating portion 113, however, operates somewhat slower to make transistor 151 proportionately conductive to bring $V_{DD}$ very close to the desired value. Thus, regulated charge pump 43 charge pumps $V_{BAT}$ and regulates the charge-pumped voltage to efficiently provide $V_{DD}$ at the desired voltage (+5.0 volts).

Bias circuit 111 provides $V_{PDD}$ at a predetermined fraction of a desired value of $V_{DD}$; the predetermined fraction is that fraction that makes $V_{PDD}$ equal to $V_{REF}$ when $V_{DD}$ is equal to its desired value. In the illustrated embodiment, the desired value of $V_{DD}$ is +5.0 volts, and the value of $V_{REF}$ is approximately 1.25 volts. Thus, in order to make $V_{PDD}$ equal to 1.25 volts when $V_{DD}$ is 5.0 volts, a fraction of 0.25 is applied. The accuracy of the fraction is determined by the technique used to generate it, which is described with reference to FIG. 5 below.

Amplifier 120 compares $V_{REF}$ to $V_{PDD}$. In the illustrated embodiment, amplifier 120 is an operational transconductance amplifier (OTA), whose output voltage varies in response to a difference in voltage between the positive and negative input terminals. The gate of transistor 150 provides a capacitive load, with transistor 122 providing a pullup to $V_{DD}$. During $\Phi1$, transmission gate 121 is active to pass the signal PCNTL at the output of amplifier 120 to the gate of transistor 150. Amplifier 120 varies signal PCNTL until the voltages at the positive and negative input terminals are equal; thus, amplifier 120 makes transistor 150 differentially more or less conductive until $V_{DD}$ is approximately equal to its desired voltage. Proportional portion 112 operates very quickly in response to changes in load conditions on $V_{DD}$; however, amplifier 120 and transmission gate 121 introduce offsets which limit the accuracy of $V_{DD}$.

Integrating portion 113 adjusts the conductivity of transistor 151 to further increase the accuracy of $V_{DD}$. Integrating portion 113 is a switched capacitor (switched-C) differential integrator which integrates a difference between $V_{PDD}$ and $V_{REF}$ over time. While slower in response than proportional portion 112, integrating portion 113 includes the history of the signal levels, which eventually cancels the offset error of proportional portion 112. Amplifier 130 is a unity-gain differential amplifier which buffers signal $V_{PDD}$ and keeps integrating portion 113 from affecting the operation of proportional portion 112. At power up, signals PCNTL and ICNTL are low in potential, making transistors 150 and 151 strongly conductive to reach the desired value of $V_{DD}$ quicker. Because of battery life reduction and a voltage drop in the power supply voltages due to a rapid change in current, known as a di/dt voltage drop, it is important to include a resistance in series with the gates of transistors 150 and 151 to decrease the switching speed somewhat (not shown in FIG. 4).

Regulated charge pump 43 provides $V_{DD}$ at a desired value of approximately 5.0 volts without having to first charge pump the battery voltage to a multiple thereof, and then to regulate or clamp the charge-pumped voltage to a desired, lower voltage. This regulation can be very advantageous for some values of $V_{BAT}$. For example, immediately after recharge, $V_{BAT}$ may be approximately 5.4 volts. A conventional voltage-doubling charge pump circuit provides a voltage of 10.8 volts, which may be harmful to circuitry designed to operate at 5.0 volts. Furthermore, conventional methods of shunt regulation or clamping also waste current. Regulated charge pump 43 provides regulation such that $V_{DD}$ is never doubled. Regulated charge pump 43 also does not use clamping devices such as Zener diodes to limit the output voltage, but rather uses proportional and integrating action to provide $V_{DD}$ with high accuracy and high efficiency.

Figure 5:
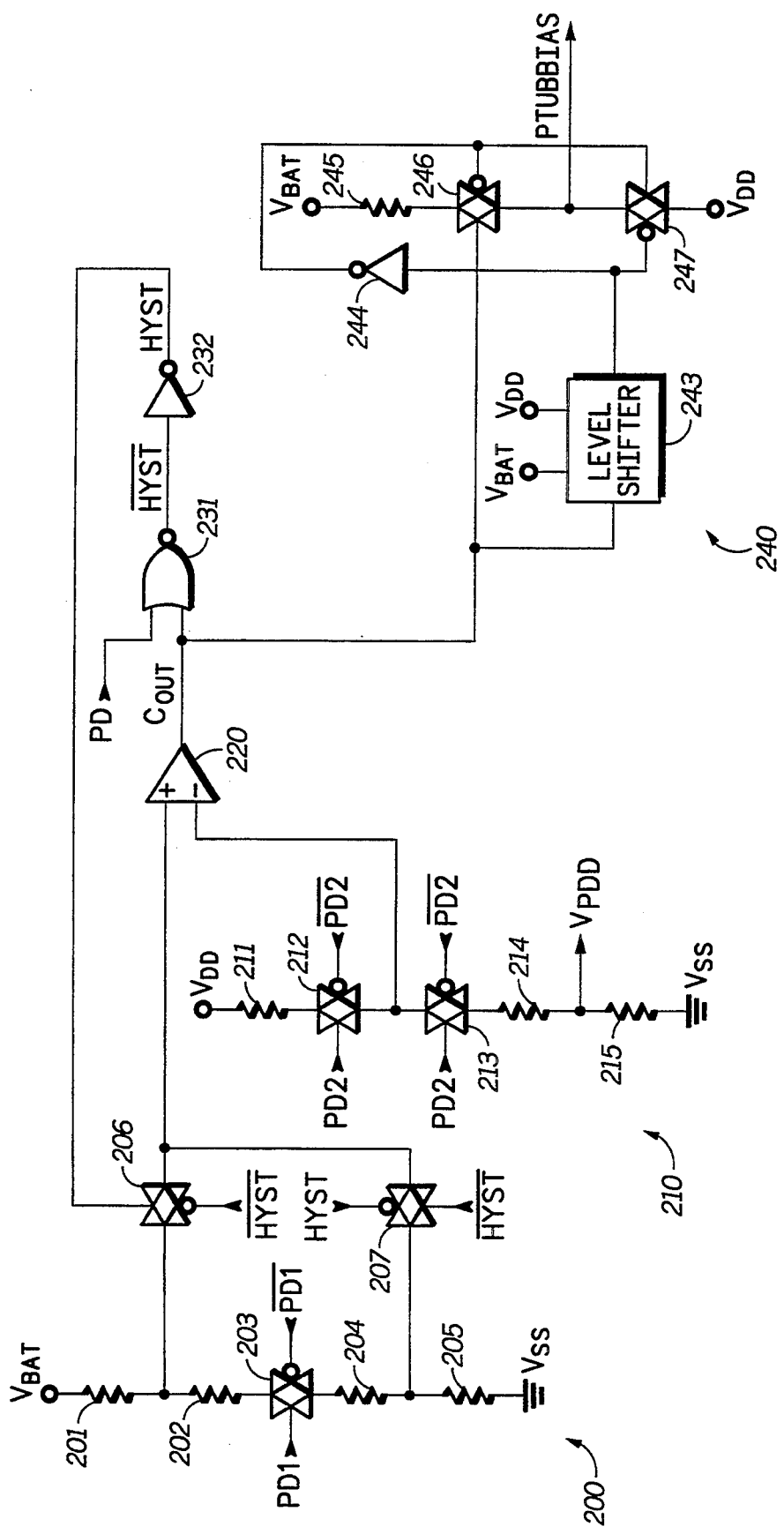
FIG. 5 illustrates in partial schematic form and partial block form the bias circuit used in the regulated charge pump of FIG. 4.

FIG. 5 illustrates in partial schematic form and partial block form bias circuit 111 used in regulated charge pump 43 of FIG. 4. Bias circuit 111 includes generally a first resistor string circuit 200, a second resistor string circuit 210, a comparator 220, a hysteresis control circuit 230, and a bias generator circuit 240. First resistor string circuit 200 includes resistors 201 and 202, a transmission gate 203, resistors 204 and 205, and transmission gates 206 and 207. Second resistor string circuit 210 includes a resistor 211, transmission gates 212 and 213, and resistors 214 and 215. Hysteresis control circuit 230 includes a NOR gate 231 and an inverter 232. Bias generator circuit 240 includes a level shifter 243, an inverter 244, a resistor 245, and transmission gates 246 and 247.

In first resistor string circuit 200, resistor 201 has a first terminal connected to $V_{BAT}$, and a second terminal. Resistor 202 has a first terminal connected to the second terminal of resistor 201, and a second terminal. Transmission gate 203 has a first current terminal connected to the second terminal of resistor 202, a second current terminal, a positive control terminal for receiving a signal labelled "PD1", and a negative control terminal for receiving a signal labelled "$\overline{PD1}$". Resistor 204 has a first terminal connected to the second current terminal of transmission gate 203, and a second terminal. Resistor 205 has a first terminal connected to the second terminal of resistor 204, and a second terminal connected to $V_{SS}$.

Transmission gate 206 has a first current terminal connected to the second terminal of resistor 201, a second current terminal, a positive control terminal for receiving a signal labelled "HYST", and a negative control terminal for receiving a signal labelled "$\overline{HYST}$". Transmission gate 207 has a first current terminal connected to the second terminal of resistor 204, a second current terminal connected to the second current terminal of transmission gate 206, a positive control terminal for receiving signal $\overline{HYST}$, and a negative control terminal for receiving signal HYST.

In second resistor string circuit 210, resistor 211 has a first terminal for receiving power supply voltage $V_{DD}$, and a second terminal. Transmission gate 212 has a first current terminal connected to the second terminal of resistor 211, a second current terminal, a positive control terminal for receiving a signal labelled "PD2", and a negative control terminal for receiving a signal labelled $\overline{PD2}$. Transmission gate 213 has a first current terminal connected to the second current terminal of transmission gate 212, a second current terminal, a positive control terminal for receiving signal PD2, and a negative control terminal for receiving signal $\overline{PD2}$. Resistor 214 has a first terminal connected to the second current terminal of transmission gate 213, and a second terminal for providing signal $V_{PDD}$. Resistor 215 has a first terminal connected to the second terminal of resistor 214, and a second terminal connected to $V_{SS}$.

Comparator 220 has a positive input terminal connected to the second current terminal of transmission gate 206, a negative input terminal connected to the second current terminal of transmission gate 212, and an output terminal for providing a signal labelled "$C_{OUT}$". In hysteresis control circuit 230, NOR gate 231 has a first input terminal for receiving a signal labelled "PD", a second input terminal connected to the output terminal of comparator 220 for receiving signal $C_{OUT}$ thereon, and an output terminal for providing signal $\overline{HYST}$. Inverter 232 has an input terminal connected to the output terminal of NOR gate 231, and an output terminal for providing signal HYST.

In bias generator circuit 240, level shifter 243 is connected to the output terminal of comparator 220, and provides an output signal on an output terminal thereof. Inverter 244 has an input terminal connected to the output terminal of level shifter 243, and an output terminal. Resistor 245 has a first terminal connected to $V_{BAT}$, and a second terminal. Transmission gate 246 has a first current terminal connected to the second terminal of resistor 245, a second current terminal for providing signal PTUBBIAS, a positive control terminal connected to the output terminal of comparator 220, and a negative control terminal connected to the output terminal of inverter 244. Transmission gate 247 has a first current terminal connected to the second current terminal of transmission gate 246, a second current terminal for receiving power supply voltage $V_{DD}$, a positive control terminal connected to the output terminal of inverter 244, and a negative control terminal connected to the output terminal of level shifter 243.

Bias circuit 111 performs two functions. First, bias circuit 111 provides signal $V_{PDD}$ for use in the proportional and integrating functions of regulated charge pump 43. Second, bias circuit 111 provides signal PTUBBIAS to bias the bulk or well of P-channel transistors in regulated charge pump 43, namely transistors 150, 151, 152, and 154, with $V_{BAT}$ or $V_{DD}$, whichever is greater. In order to understand the remainder of the operation, it is first necessary to describe the control signal generation. Signal PD is a powerdown indication active at a logic high. Signal PD1 is equivalent to a logical AND of signals PD and $C_{OUT}$ and is active at a logic low. Signal PD2 is equivalent to signal PD1 but is level-shifted to $V_{DD}$ and is active at a logic low.

Resistor string circuit 210 performs the first function of providing signal $V_{PDD}$. When control signals PD2 and $\overline{PD2}$ are inactive, $V_{PDD}$ is provided as the product of a resistive voltage division between resistors 211, 214, and 215. Thus, $$V_{PDD} = V_{DD}(R_{215}/(R_{211} + R_{214} + R_{215}))$$

where $R_{211}$ is the resistance of resistor 211, $R_{214}$ is the resistance of resistor 214, and $R_{215}$ is the resistance of resistor 215. By choosing proper resistor values, $V_{PDD}$ can be made equal to $0.25V_{DD}$; thus, for a value of $V_{DD} = 5.0$ volts, $V_{PDD}$ is equal to 1.25 volts. When regulated charge pump 43 alters $V_{DD}$ until $V_{REF} = V_{PDD}$, and since $V_{REF} = 1.25$ volts, resistor string circuit 210 assures that $V_{DD}$ is equal to 5.0 volts with high accuracy.

It is important to provide relatively high values for resistors 211, 214, and 215 to limit the current flowing therethrough. In order to provide the high resistances, lightly-doped diffusion or well resistors are preferred. These resistors are preferable to polysilicon resistors because, although polysilicon resistors are more accurate, they require much more circuit area. For example, a typical resistivity of a polysilicon resistor is approximately 20 ohms per square, whereas the resistivity of a well resistor is approximately 1.4 kilohms per square. In the preferred embodiment, $R_{211}$ is 105 kilohms, $R_{214}$ is 53.2 kilohms, and $R_{215}$ is 51.8 kilohms. Thus, low current flow is assured.

The second function of bias circuit 111 is to provide voltage PTUBBIAS in order to assure reliable operation of regulated charge pump 43 under varying power supply conditions, such as during power up. Immediately after power up, $V_{DD}$ has not yet attained its target value of 5.0 volts and may in fact be very close to zero. If N-wells were always biased to $V_{DD}$, then immediately after power up a diffusion-to-well PN junction may become forward biased, which would be harmful to the integrated circuit. Thus, bias generator circuit 240 provides PTUBBIAS at a voltage of essentially $V_{BAT}$ when either $V_{BAT}$ is greater than $V_{DD}$ or when signal PD is active.

In order to compare $V_{DD}$ to $V_{BAT}$, resistor string circuit 200 performs a similar voltage division as resistor string circuit 210. There is one difference, however. Resistor string circuit 200 includes hysteresis. After powerup (PD is inactive), when the battery voltage $V_{BAT}$ exceeds $V_{DD}$, signal $C_{OUT}$ is activated. Since PD is inactive, hysteresis control circuit 230 activates signal $\overline{HYST}$ at a logic low, and activates signal HYST at a logic high, making transmission gate 206 active and transmission gate 207 inactive. Thus, the voltage proportional to $V_{BAT}$ applied to the positive input terminal of comparator 220 is taken from the second terminal of resistor 201 in resistor string circuit 200. However, as soon as $V_{PDD}$ exceeds the potential of the second terminal of resistor 201, $C_{OUT}$ becomes negated. Hysteresis control circuit 230 inactivates $\overline{HYST}$ at a logic high, and inactivates signal HYST at a logic low. Transmission gate 206 is inactive, and transmission gate 207 is active and the proportional voltage is now taken from the second terminal of resistor 204. Since now an additional voltage drop is introduced by resistors 202 and 204, $V_{DD}$ must decrease by an additional amount before $C_{OUT}$ is again activated. Thus, the hysteresis provided by bias circuit 111 prevents instability under varying power supply conditions.

While the invention has been described in the context of a preferred embodiment, it will be apparent to those skilled in the art that the present invention may be modified in numerous ways and may assume many embodiments other than that specifically see out and described above. For example, $V_{SS}$ could be the positive power supply with the other power supply voltages $V_{BAT}$, $V_{DD}$, and $V_{DSP}$ at negative voltages in reference thereto. Furthermore, although battery voltage $V_{BAT}$ was illustrated, mixed signal processing system 22 provides the same advantages when any highly variable power supply voltage is used. In addition, a different number and type of batteries may be used, as long as the voltage during the operating life is at least 2.7 volts. In another embodiment, a portion of digital subsystem 51 may be coupled to $V_{DD}$ to maximize speed. Also, $V_{DD}$ could be generated by a switching regulator, also called a switch mode regulator. Accordingly, it is intended by the appended claims to cover all modifications of the invention which fall within the true spirit and scope of the invention.

I claim:

1. A regulated charge pump comprising:
a charge pump core for boosting a first voltage existing at a first
terminal of a charging capacitor during a first
predetermined time period, by an amount equal to a first
power supply voltage referenced to a second power supply
voltage during a second predetermined time period, and
providing a regulated charge-pumped voltage in response,
said charge pump core comprising first and second transistors;
said first transistor having a first current electrode for receiving
said first power supply voltage, a control electrode, and a
second current electrode coupled to said first terminal of
said charging capacitor;
said second transistor having a first current electrode for
receiving said first power supply voltage, a control electrode, and a second current electrode coupled to said
first terminal of said charging capacitor;
proportional means coupled to said control electrode of said first
transistor, for changing said first voltage proportionately
in response to a difference between a reference voltage and a proportional voltage by altering a conductivity of said first transistor, said proportional voltage being a predetermined fraction of said regulated charge-pumped voltage, said predetermined fraction making said proportional voltage equal to said reference voltage when said regulated charge-pumped voltage is equal to a desired value; and integrating means coupled to said control electrode of said second transistor, for further changing said first voltage proportionately in response to an integration of a difference between said proportional voltage and said reference voltage by altering a conductivity of said second transistor.

2. The regulated charge pump of claim 1 wherein said charge pump core comprises storing means coupled to said first terminal of said charging capacitor, for storing a voltage at said first terminal of said charging capacitor during said second predetermined time period.

3. The regulated charge pump of claim 2 wherein said storing means comprises:
a holding capacitor having a first terminal for providing said regulated charge-pumped voltage thereon, and a second terminal for receiving said second power supply voltage; and
coupling means for coupling said first terminal of said charging capacitor to said first terminal of said holding capacitor during said second predetermined time period.

4. The regulated charge pump of claim 1 wherein said charge pump core further comprises:
a third transistor having a first current electrode coupled to a second terminal of said charging capacitor, and a second current electrode for receiving said second power supply voltage, said third transistor conductive during said first predetermined time period; and
a fourth transistor having a first current electrode for receiving said first power supply voltage, and a second current electrode coupled to said second terminal of said charging capacitor, said fourth transistor conductive during said second predetermined time period.

5. The regulated charge pump of claim 4 further comprising biasing means for biasing a bulk of said first, second, and fourth transistors at a higher one of either said first power supply voltage or said regulated charge-pumped voltage.

6. The regulated charge pump of claim 6 wherein said biasing means comprises:
means for providing first and second voltages of said biasing means respectively at first and second fractions of said first power supply voltage;
means for providing a third voltage of said biasing means at a third fraction of said regulated charge-pumped voltage;
a comparator having a positive input terminal, a negative input terminal, and an output terminal for providing a compare output signal;
means for coupling said first voltage of said biasing means to said positive input terminal of said comparator in response to said compare output signal, and for coupling said second voltage of said biasing means to said positive input terminal of said comparator otherwise; and
means for providing said first power supply voltage as a bulk bias voltage in response to said compare output signal, and for providing said regulated charge-pumped voltage as said bulk bias signal otherwise.

7. The regulated charge pump of claim 1 wherein said proportional means comprises means for making said first transistor nonconductive during a third predetermined time period, and wherein said integrating means comprises means for making said second transistor nonconductive during said third predetermined time period, said third predetermined time period occurring other than during said first predetermined time period.

8. The regulated charge pump of claim 1 wherein said reference voltage is characterized as being a bandgap reference voltage.

9. The regulated charge pump of claim 1 wherein said proportional means comprises a comparator having a first input terminal for receiving said reference voltage, a second input terminal for receiving said proportional voltage, and an output terminal, said proportional means changing said voltage at said first terminal of said charging capacitor in response to a voltage at said output terminal of said comparator.

10. The regulated charge pump of claim 1 wherein said first and second transistors each comprises a P-channel MOS transistor.

11. The regulated charge pump of claim 1 wherein said proportional means alters said conductivity of said first transistor during said first predetermined time period, and wherein said integrating means alters said conductivity of said second transistor during said first predetermined time period.

12. A regulated charge pump comprising:
a charge pump core comprising:
a charging capacitor having first and second terminals;
means for selectively coupling said second terminal of said charging capacitor to a first power supply voltage terminal in response to a first clock signal;
means for selectively coupling said second terminal of said charging capacitor to a second power supply voltage terminal in response to a second clock signal;
a first transistor having a first current electrode coupled to said first power supply voltage terminal, a control electrode, and a second current electrode coupled to
said first terminal of said charging capacitor;
a second transistor having a first current electrode coupled
to said first power supply voltage terminal, a control electrode, and a second current electrode
coupled to said first terminal of said charging capacitor; and
means for storing a voltage existing at said first terminal
of said charging capacitor in response to said second
clock signal, and for providing a regulated charge-pumped voltage in response thereto;
bias means for providing a proportional voltage as a predetermined proportion of said regulated charge-pumped
voltage, said predetermined proportion being
such that said proportional voltage is equal to a reference
voltage when said regulated charged-pumped voltage has a
predetermined value;
proportional means for comparing said proportional voltage to
said reference voltage and making said first transistor
conductive in response; and
integrating means for integrating a difference between said
proportional voltage and said reference voltage and for
making said second transistor proportionately conductive
in response.

13. The regulated charge pump of claim 12 wherein said proportional means comprises:
an operational transconductance amplifier having a positive
input terminal for receiving said proportional voltage, a
negative input terminal for receiving said reference voltage, and an output terminal;
a transmission gate having a first terminal coupled to said output
terminal of said operational transconductance amplifier,
and a second terminal coupled to said control electrode of
said first transistor, said transmission gate made conductive
in response to said first clock signal.

14. The regulated charge pump of claim 12 wherein said integrating means comprises:
an amplifier having a positive input terminal for receiving said
proportional voltage, a negative input terminal, and an
output terminal coupled to said negative input terminal
thereof;
a switched capacitor integrator coupled to said amplifier for
providing an output voltage in response to an integration
of said difference between said proportional voltage and
said reference voltage; and
a first transmission gate having a first terminal for receiving said
output voltage of said switched capacitor integrator, and a
second terminal coupled to said control electrode of said
second transistor, said first transmission gate made conductive in response to said first clock signal.

15. A method of providing a regulated charge-pumped voltage comprising the steps of:
providing a charging capacitor;
alternately, coupling a second terminal of said charging capacitor
to a first power supply voltage terminal, or coupling said
second terminal of said charging capacitor to a second
power supply voltage terminal, respectively in response to
first and second non-overlapping clock signals;
providing the regulated charge-pumped voltage in response to a
first voltage at a first terminal of said charging capacitor;
forming a second voltage proportional to the regulated charge-pumped
voltage;
comparing said second voltage to a reference voltage;
biasing a first transistor, coupled between said first power supply
voltage terminal and a first terminal of said charging
capacitor, to be conductive proportionally to a
comparison of said second voltage to said reference voltage;
integrating a difference between said second voltage and said
reference voltage; and
biasing a second transistor, coupled between said first power
supply voltage terminal and said first terminal of said
charging capacitor, to be conductive proportionally to
an integrated difference between said second voltage
and said reference voltage.

16. A circuit for providing a bulk bias voltage comprising:
means for providing first and second voltages respectively at
first and second fractions of a first power supply voltage;
means for providing a third voltage at a third fraction of a
second power supply voltage;
a comparator having a positive input terminal, a negative input
terminal, and an output terminal for providing a
compare output signal in either a first state in response to
a voltage at said positive input terminal exceeding a
voltage at said negative input terminal, or in a second state in response to said voltage at said negative input terminal exceeding said voltage at said positive input terminal;

means for coupling said first voltage to said positive input terminal of said comparator in response to said compare output signal being in said first state, and for coupling said second voltage to said positive input terminal of said comparator in response to said compare output signal being in said second state; and means for providing said first power supply voltage as the bulk bias voltage in response to said compare output signal being in said first state, and for providing said second power supply voltage as said bulk bias voltage in response to said compare output signal being in said second state.

17. The circuit of claim 16 wherein said means for providing said first and second voltages comprises:
a first resistor having a first terminal for receiving said first power supply voltage, and a second terminal for providing said first voltage;
a second resistor having a first terminal coupled to said second terminal of said first resistor, and a second terminal;
a transmission gate having a first terminal connected to said second terminal of said second resistor, and a second terminal, and made conductive in response to a powerdown signal;
a third resistor having a first terminal coupled to said second terminal of said transmission gate, and a second terminal for providing said second voltage; and
a fourth resistor having a first terminal coupled to said second terminal of said third resistor, and a second terminal for receiving a third power supply voltage.

18. The circuit of claim 16 wherein said means for providing said third voltage comprises:
a first resistor having a first terminal for receiving said second power supply voltage, and a second terminal;
a first transmission gate having a first terminal connected to said second terminal of said first resistor, and a second terminal connected to said negative input terminal of said comparator, and made conductive in response to a powerdown signal;
a second transmission gate having a first terminal connected to said second terminal of said first transmission gate, and a second terminal, and made-conductive in response to said powerdown signal;
a second resistor having a first terminal coupled to said second terminal of said second transmission gate, and a second terminal for providing a fourth voltage; and
a third resistor having a first terminal coupled to said second terminal of said second resistor, and a second terminal for receiving a third power supply voltage.

19. The circuit of claim 16 wherein said first power supply voltage is a battery voltage.

* * * * *